Patented Sept. 17, 1935

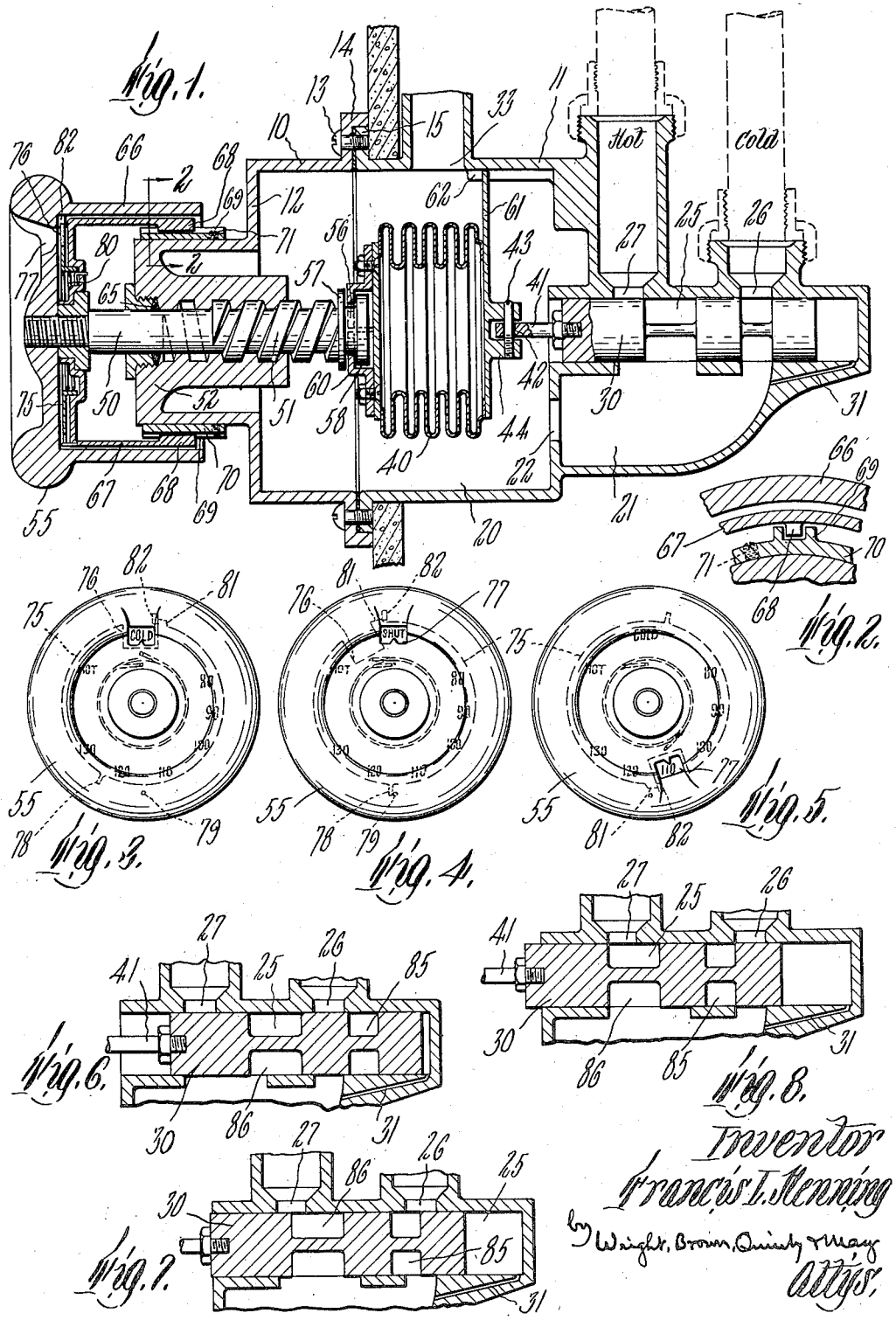

2,014,526

UNITED STATES PATENT OFFICE 2,014,526

THERMOSTATIC VALVE

Francis L. Henning, Boston, Mass., assignor of one-half to Jacob A. Stryker, Arlington, Mass.

Application June 28, 1933, Serial No. 678,016

4 Claims. (Cl. 236—12)

This invention relates to valve mechanism for controlling the flow of hot and cold water into a mixing chamber so that the mixed stream which is discharged from the valve mechanism will be maintained at a predetermined temperature.

The embodiment of the invention herein described in detail is characterized by comparative simplicity of structure and positive action, and is capable of automatically maintaining the delivered stream at the temperature of the hot water supply or of the cold water supply or of any intermediate temperatures between these two extremes. The valve mechanism is so arranged that, in case the hot water supply is not as hot as the temperature desired for the discharge stream, the cold water valve is entirely shut off and the discharge stream is thus maintained at a temperature as near as possible to the desired temperature.

There are various other advantageous features of structure which will be apparent to one skilled in the art from the description of an embodiment of the invention which follows, and from the illustration thereof on the drawing of which Figure 1 is a sectional view of valve mechanism embodying the invention.

Figure 2 is a fragmentary section on the line 2—2 of Figure 1.

Figures 3, 4 and 5 are end elevations of the operating handle of the mechanism, showing the temperature-indicating means in three different positions of operation.

Figures 6, 7 and 8 are fragmentary sectional views of the valve and valve chamber, showing the valve in different positions of operation.

The mechanism illustrated on the drawing consists of a casing 10 which includes a hollow receptacle portion 11 and a cover member 12. The cover member 12 is removably secured to the receptacle portion 11 as by a series of screws 13 which pass through a flange 14 on the cover section and are in threaded engagement with a flange 15 on the receptacle portion of the casing. The casing 10 encloses a main chamber 20, a mixing chamber 21 being enclosed in an extension of the casing so as to open into the main chamber through a constricted opening 22. The extension of the casing 10 also encloses a valve chamber 25, which, as indicated in Figure 1, may be elongated and alined with the central portion of the cover member 12. The valve chamber 25 is provided with a cold water inlet 26 and a hot water inlet 27. The amount of opening of these inlets is varied by a valve member 30 which is slidably mounted in the valve chamber 25. The valve chamber 25 may open directly into the mixing chamber 21 as shown. A vent 31 connects the end portion of the chamber 25 with the mixing chamber 21 to relieve the end of the valve chamber 25 beyond the end of the valve member 30. A discharge outlet 33 from the main chamber 20 is provided, this outlet preferably leading from some convenient point in the side wall of the receptacle portion 11 of the casing. Within the main chamber 20 is mounted a longitudinally expansible bellows 40, one end of the bellows being attached to the valve 30 as by a joint capable of limited universal movement. The connecting means may consist of a stem 41 secured to the valve 30 and provided with an eye 42 through which extends a pin 43, this pin being secured in a pair of ears 44 on the end of the bellows 40. The pin 43 fits loosely in the eye 42 so as to permit a limited rocking movement of the end of the bellows 40 with reference to the stem 41. This prevents binding of the slidable valve member 30 in the valve chamber 25 in case the bellows 40 expands unevenly. The opposite or forward end of the bellows is swivelly connected to a shaft 50 which projects through a central portion of the cover member 10 and is axially movable to adjust the position of the end of the bellows to which it is attached. As shown, the shaft 50 is provided with a screw threaded portion 51 in threaded engagement with a boss 52 forming a part of the cover member 10. An operating handle 55 is secured to the outer end of the shaft 50 so that rotation of the handle 55 results in axial movement of the shaft 50 by reason of its threaded engagement with the cover member 10. The end portion of the shaft 50 adjacent to the bellows 40 is provided with a groove 56 between a pair of flanges 57, 58. The groove 56 receives a plurality of fingers 60 which are mounted on the adjacent end of the bellows 40 and which ride in the groove 56 to cause the end of the bellows to move axially with the shaft 50 but without rotating therewith. The bellows may be held against rotation by any convenient means such as an arm 61 extending laterally from the bellows 40, an end of the arm 61 riding between a pair of guide ribs 62. The bellows preferably contains a thermally expansible substance or substances, so that, when the temperature thereof is changed, the bellows expands or contracts longitudinally. If one end of the bellows is anchored, the other end will move when the bellows expands or contracts. The shaft 50, with its screw-threaded engagement with the cover member 10, holds one end of the bellows in adjusted fixed position so that the valve slide 30, which is attached to the other end of the bellows, moves in accordance with changes of temperature within the bellows. The shaft 50 is preferably provided with a water-tight packing 65.

Adjustment of the forward end of the bellows 40 by rotation of the shaft 50 is accomplished by manipulation of the hand wheel 55 which is attached to the end of the shaft. This hand wheel may be provided with a flange or skirt 66 which surrounds a cup-shaped scale member 67. The scale member is provided with a spline 68 slidable between a pair of ribs 69 on a sleeve 70 which is fitted on the exterior surface of the boss 52 on the cover member 12. The sleeve 70 may be secured adjustably to the boss 52 as by one or more set screws 71. The scale member 67 is thus free to move axially with the axial movement of the shaft 50 but is held against rotation by the spline 68. As indicated in Figures 3, 4 and 5, the scale member 67 may be suitably marked with figures indicating water temperatures, and may also carry the legends "cold" and "hot". Between the forward flat face of the scale member 67 and the rear flat face of the hand wheel 55 is loosely mounted a disk 75 which serves as a screen. As indicated in Figures 3, 4 and 5, this disk is peripherally notched at one point as at 76 to expose one of the members on the scale member 67. The hand wheel 55 is apertured as at 77 to provide a window through which the numbers on the scale member can be successively observed as the hand wheel is turned. When the valve is closed, as shown in Figure 4, the window 77 and notch 76 are not in registry, so that the face of the scale member 67 is completely hidden. The relative position of the scale member 67 and the screen disk 75 when the valve is shut, is determined by the engagement of a lug 78 on the periphery of the disk 75 with a pin 79 on the scale member 67. A light coil spring 80 is attached to the scale 67 and screen disk 75 so as to tend to rotate the disk in a counter-clockwise direction, and to hold the lug 78 against the pin 79. A lug 81 projects from the periphery of the disk 75 at a point adjacent to the notch 76. This lug cooperates with a lug 82 on the rear face of the hand wheel 55 to turn the disk 75 in a clockwise direction after the wheel 55 has made a full turn. The operation of the hand wheel and indicating apparatus is illustrated in Figures 3, 4 and 5. Figure 4 shows the position of the parts when the valve is shut. In order to open the valve, the hand wheel 55 is turned in a clockwise direction for a full turn. This opens the cold water valve. Just before completing this full turn, the hand wheel 55 picks up the disk 75 by the engagement of the lug 82 with the lug 81, as indicated in Figure 3. The window 77 is then in registry with the notch 76, so that, when a full turn of the wheel is complete, the legend "cold" appears. Further rotation of the wheel 55 results in simultaneous movement of the disk 75 therewith so that the numbers representing water temperatures are successively exposed, as illustrated in Figure 5. To shut off the valve, the wheel 55 is turned in a counter-clockwise direction. During the initial portion of the shutting off movement, the disk 75 follows the rotation of the wheel 55 owing to the pressure of the spring 80. When the disk reaches its initial position and the lug 78 engages the fixed pin 79, the wheel is then rotated further to shut the valve completely.

The valve member 30 may consist of a single plunger having a pair of ports 85 and 86 adapted to register respectively with the inlets 26 and 27 so as to admit cold water, hot water, or a mixture of the two into the mixing chamber 21. Figure 6 illustrates a position on the valve member 30 when the valve is shut. Rotation of the hand wheel 55 one full turn moves the valve slide to approximately the position shown in Figure 1 in which the cold water inlet 26 is connected to the mixing chamber 21. The exact position of the valve 30 at any time will depend not only on the setting of the hand-wheel 55, but also on the degree of expansion of the bellows 40. Further rotation of the hand wheel 55 brings the valve member 30 to a position such as is shown in Figure 7. In such case the cold and hot water inlets 26 and 27 are both connected to the mixing chamber 21 through the ports 85 and 86, the amount of the openings of the inlets 26 and 27 being determined by the angle of rotation of the hand wheel 55 and by the degree of expansion or contraction of the thermostatic bellows 40. The parts may be so constructed that, when the hand wheel 55 is turned as far as possible in a clockwise position, the valve will be moved so far forward that the cold water inlet will be cut off completely, even when the bellows 40 is fully expanded. This results in a supply to the mixing chamber of hot water only. To provide for water supply under such circumstances, the port 86 may be made wider than the hot water inlet 27 so that the port may remain in registry with the inlet through a considerable expansion and contraction of the bellows 40.

It is evident that, when the hand wheel is rotated more than a full turn so as to bring the window 77 and the notch 76 in registry with one of the numbers indicating temperature, both of the inlets 26 and 27 will ordinarily be in registry with the ports 85 and 86. The amount of opening of each of the inlets will be governed by the temperature desired and by the temperatures of the hot and cold water supply streams. If, for example, the hand wheel is turned so as to expose the numeral 110, as shown in Figure 5, this movement of the hand wheel will first open the cold water inlet 26 and then will additionally move the valve member 30 further forward to open the hot water inlet 27. If the apparatus is cold at the time, the bellows will be contracted so that this additional movement will probably shut off the cold water inlet. As soon as the hot water stream, which ordinarily runs cold at first, becomes hot at the valve, this hot water washes the bellows 40 in the main chamber 20 and causes the bellows to expand, moving the valve member 30 rearwardly. This rearward movement of the valve member opens up the cold water inlet 26 sufficiently to maintain the temperature of the mixed cold and hot water streams at the figure indicated through the window 77.

When the valve is initially installed, the scale is regulated by turning on the valve until the discharge stream issues at a constant temperature substantially equal to one of the numbers on the scale. The set screws 71 are then loosened and the scale is rotatively adjusted with the collar 70 until the corresponding temperature number on the scale appears through the window 77. The set screws 71 are then set up, whereupon the valve is ready for use. This greatly simplifies the installation of the valve.

Various changes and modifications in the structure herein shown and described may be made without departing from the spirit or scope of the invention as defined in the following claims.

What I claim is:

1. Valve mechanism of the class described, comprising a casing having a receptacle portion and a cover portion and enclosing a main chamber and a valve chamber communicating with the main chamber and having hot and cold water inlets, a longitudinally expansible bellows in said main chamber, means for preventing rotation of said bellows, a screw-threaded shaft projecting through said cover portion in threaded engagement therewith and swivelly connected to an end of said bellows, and a valve member attached to the other end of said bellows and slidable in said valve chamber in the direction of expansion of said bellows to vary the openings of said hot and cold water inlets, said bellows, valve and shaft being removable as a unit from said receptacle portion of the casing.

2. Valve mechanism of the class described, comprising a casing having a boss, a valve slide in said casing, an operating shaft threaded through said boss and operably connected to said slide valve, a sleeve adjustably fixed in said boss, a scale member loosely mounted on said shaft and in splined engagement with said sleeve, and a handle on said shaft having an index cooperating with said scale member.

3. Valve mechanism of the class described, comprising a casing having a boss, a valve slide in said casing, an operating shaft threaded through said boss and operably connected to said valve slide, a sleeve adjustably fixed on said boss, a cup-shaped scale member loosely mounted on said shaft and in splined engagement with said sleeve, a marking disk loosely mounted on said shaft in front of said scale member, said disk having a notch therein, a circular handle mounted on said shaft in front of said disk, said handle having an aperture therein adapted to register with said notch, and interengaging means on said handle and scale member for maintaining said aperture and notch in registry after the handle has been turned a predetermined angle toward the open valve position.

4. Valve mechanism of the class described, comprising a casing enclosing a main chamber and a valve chamber extending from said main chamber and having lateral inlets for hot and cold water, a thermostatic bellows in said main chamber, means for adjustably moving one end of said bellows, said means including an operating shaft extending through said casing substantially in line with said valve chamber, a slide valve member slidable in said valve chamber, and means connecting said valve member to the other end of said bellows with a slight lateral play but substantially no longitudinal play between the bellows and valve member.

FRANCIS L. HENNING.